Patented Aug. 10, 1937

2,089,480

UNITED STATES PATENT OFFICE 2,089,480

PAPER COATING COMPOSITION AND PROCESS

Clark C. Heritage, Rumford, Maine, assignor to Oxford Paper Company, a corporation of Maine No Drawing. Application October 26, 1932, Serial No. 639,735

8 Claims. (Cl. 134—18)

This invention resides in the art of coating paper and has to do with the coating composition and the method of producing it.

The advantages of the invention flow apparently chiefly from more complete distribution of the pigment. Whatever may be the reason, the obvious fact is that the coating has marked advantages over other commercial paper coatings. For example, the coating has the merit of being easily polished to a very high gloss, which gloss is combined with superior surface smoothness. It possesses flexibility, is firmly bound to the body stock, and shows an excellent brightness of color with a high opacity. In addition it has a rapid ink absorption and a good bulk. As a consequence of the ease with which the coating may be polished, heavy calendering pressures are unnecessary and the discoloration which tends to follow heavy calendering pressures is avoided. Also because of the light calendering pressures, the ink absorbing properties are not substantially impaired, and a rapid ink absorption is therefore obtained with a coating of extremely high gloss.

Generically the method of this invention resides in precipitating a compound pigment directly upon a filler pigment. Specifically, in the preferred embodiment, a white coating is produced by precipitating calcium sulphate and aluminum hydroxide directly upon particles of a filler pigment, such as clay, suspended in water, and adding an appropriate adhesive such as casein thereto.

In carrying out the process in this particular form, lime, alum and clay will be kept on hand in dry form and when the coating is to be prepared a suspension of the clay in water will be produced, and lime incorporated therewith to form a slip or suspension of clay and calcium hydroxide. The respective materials are well mixed and thoroughly incorporated together, and then alum in solution is added to the slip, followed by a small amount of alkali, causing a precipitation of calcium sulphate and aluminum hydroxide in the presence of the clay particles. It is probable that the particles of clay are thoroughly enveloped in the enrobing layer of voluminous aluminum hydroxide carrying the calcium sulphate precipitate. Whether or not it is due to better distribution of the white pigment precipitate than it is possible to obtain by stirring a previously prepared pigment into a clay suspension in water, certain it is that the material thus produced makes potential new and useful properties in the coating when the material is applied upon paper.

In preparing the product of this invention and in practicing the process, the following materials in substantially the proportions and manner given may be used, it being understood that this is merely illustrative and that the proportions may vary substantially according to the precise results desired:

| | Parts |
|---|---|
| Cold water | 75 |
| English china clay | 50 |
| Hydrated lime | 14 |
| Water | 23 |
| Alum | 17 |
| Water | 7 |
| Soda ash | 0.5 |
| Ammonia | 0.2 |
| Water | 55 |
| Casein | 15 |

The process may be begun by mixing the cold water and the clay in an appropriate container with the hydrated lime. This mixture should be stirred for about twenty minutes, that is, stirring should be begun when the water is in the mixing vessel, and continued for a somewhat longer time than is required for the addition of the dry solids to the container. The alum should be separately dissolved in the second quantity of water and heated to a temperature of 42° C. When this temperature is reached the alum solution is added to the mixture or slip of lime and clay in water as rapidly as possible. After the addition of the alum solution the stirring should be continued for about two and a half hours. The reaction between the lime and alum will raise the temperature to about 65° C.

The soda ash is to be dissolved in the third quantity of water at a boiling temperature and added to the composition at the end of the two and a half hours of stirring. Simultaneously with the addition of the soda ash, cooling water in a coil or jacket of the mixing vessel should be turned on and the preparation cooled as rapidly as possible to 25° C. When this temperature is reached, the ammonia of 26° Baumé of a specific gravity of 0.8974 is added, and the stirring continued for five minutes longer.

The casein solution is separately made in substantially the quantity indicated and after the ammonia is added to the mixture and the mixture stirred the required five minutes, 14 parts of the casein solution are added to the preparation, and the stirring continued for at least one hour and preferably two hours. At the end of this period the remainder of the casein solution is added. The preparation is then ready for use. If, however, it is not required for immediate use, or the entire quantity is not transferred at once to the coating machine, stirring should be continued until the preparation has been entirely removed from the mixing vessel. It appears that the continuance of the stirring is desirable to maintain the homogeneity of the preparation, and to maintain other of the desirable properties.

The material prepared by the process above described is a very satisfactory coating material having desirable physical properties surpassing those of other coating preparations. The fact that the precipitation of the white pigment material has occurred in the presence of the clay results in a more thorough distribution of the pigment, each particle of the filler being more completely coated with the pigment than is possible to effect by stirring previously formed pigment into a clay suspension in water.

It may be noted that a small proportion of soda ash is added to the mixture after the primary reaction is complete. It is found that the addition of this small quantity of soda ash produces beneficial results by improving the obtainable polish, increasing the smoothness of the finished paper sheet, and improving the ink absorption. While all the inherent reasons for the benefits obtained are not definitely known, it seems possible that the sodium carbonate in the soda ash reacts with a small excess of lime to form calcium carbonate, which appears to be a beneficial supplementary pigment in the mixture.

The ammonia added with the soda ash is found to improve the working qualities of the prepared pigment on the coating machine, and to minimize settling of the pigment. It also appears to have a beneficial effect upon the adhesive, and to improve the physical state of the pigment precipitate.

The coating mixture as thus prepared may then be applied to paper stock in the usual way in the usual type of coating machine, and dried in the usual way.

After drying the material may be calendered in the usual type of calendering roll stand, but the response of the coating to calendering operations is quite different in character from that of other coatings. The obtained gloss is higher than that obtainable by simple super-calendering of other coating preparations suitable for coating job printing paper. This extremely high gloss combined with excellent smoothness is also obtained by a calender roll pressure which is substantially less than that used for calendering other white coatings, and is accompanied by no blackening or discoloration. Furthermore, the complete coating in spite of the extremely high gloss is well bound, and has rapid absorption of printing ink, a property not usually characteristic of highly calendered gloss coatings.

It has been found possible to obtain a gloss of 90% and even higher as measured on the Ingersoll glarimeter, without blackening. The resulting surface is substantially free from roughness or mottling of any kind.

The coating as above described is thus found to have a unique combination of characteristics. It has an extremely high gloss together with an extremely high whiteness, excellent smoothness, good printing qualities of rapid ink absorption, good opacity, flexibility of the coating, and a strong bonding, all of which qualities have not been previously found together in any single coated paper.

The main advantage of the process as above described is considered to result from the precipitation of a pigment of high whiteness directly upon a bulky filler pigment, and is described in connection with clay as a filler pigment and alum and lime as the reacting agents. It is, however, to be understood that other reacting agents may be used. Other fillers than clay may also be used, such as barytes, zinc oxide, lithopone, etc. Likewise, other alums or sulphates may be used, such as magnesium sulphate and zinc sulphate. If a colored coating is desired, it is of course possible to substitute other alums or sulphates of metals forming colored compounds such as iron, chromium, copper, etc. Likewise, the lime as calcium oxide may be replaced by dolomitic lime containing magnesium, as well as by other substances which will be obvious to those skilled in the art. Certain other desirable effects may also be obtained by the addition of small quantities of certain other pigments. For instance, small proportions of titanium dioxide, or preparations containing titanium dioxide, may be added to the mixture at an appropriate stage in the preparation thereof. Likewise talc and other equivalent substances also produce desirable effects for certain purposes obvious to those skilled in the art.

It may be noted that not only does this process produce a coating much superior to any previously known coating compositions, but the material is particularly easy to prepare, and commercially lower in cost than other high grade coating preparations, especially in view of the fact that the raw materials are received in the dry form, thereby avoiding the shipping costs upon water in pasty preparations, and also the shipping charges and return charges upon water-tight receptacles. Likewise, a very substantial manufacturing convenience is obtained by the preparation of the entire composition in a single container, in which it may be stored for use and kept in condition for immediate use.

While there are above disclosed but a limited number of embodiments of the process of this invention, it is possible to produce still other modifications thereof without departure from the inventive concept disclosed, and it is accordingly desired that only such limitations shall be imposed upon the appended claims as are stated therein or required by the prior art.

The invention claimed is:

1. The process for making a coating composition suitable for coating paper which process includes mixing hydrated lime, a base pigment and water, stirring the mixture for approximately twenty minutes to form a slurry, making a solution of alum in warm water and adding this solution to the slurry, stirring the mixture so formed for approximately two and one half hours, adding to the reacting mixture soda ash in boiling water and stirring the mix for approximately twenty minutes, cooling the mix, adding ammonia to the mix and stirring for approximately five minutes and thereafter adding casein.

2. The process of making a coating composition suitable for coating paper, which includes the steps of forming a slurry of a base pigment mixed with water and with hydrated lime comprising by weight more than 5% of the base pigment, and adding thereto a water solution of alum sufficient to form by its reaction with the lime a pigment comprising at least 15% of the total pigment of the coating composition.

3. The process of making a coating composition suitable for coating paper, which includes the steps of forming a slurry of a base pigment mixed with water and with hydrated lime comprising by weight more than 5% of the filler substance and then causing alum to react with a portion of the lime leaving the rest as free lime.

4. The process of making a coating composition suitable for coating paper, which includes the steps of forming a slurry of a base pigment mixed with water and with hydrated lime comprising by weight more than 5% of the filler substance and then causing alum to react with substantially 90% of the lime leaving the rest as free lime.

5. The process of making a coating composition suitable for coating paper, which includes the steps of forming a slurry of a base pigment mixed with water and with hydrated lime comprising by weight more than 5% of the base pigment, then causing alum to react with substantially 90% of the lime leaving the rest as free lime, then adding a small percentage of alkali other than lime, and then adding an adhesive to the mixture.

6. A coating preparation comprising the products of admixture with a suspension of a base pigment in water of hydrated lime exceeding 5% of the base pigment by weight, and a solution of crystallized alum approximating the lime in weight.

7. A coating preparation comprising the products of admixture with a suspension of a base pigment in water of hydrated lime exceeding 5% of the base pigment by weight, a solution of crystallized alum approximating the lime in weight, and a small percentage of alkali other than lime not substantially exceeding 3% of the lime and alum.

8. A coating preparation comprising the products of admixture with a suspension of substantially 50 parts of a base pigment in water, of a water solution of between 10 and 15 parts of hydrated lime, a water solution of between 15 and 20 parts of crystallized alum, and a water solution of an alkali other than lime not exceeding one part.

CLARK C. HERITAGE.